United States Patent
Li et al.

(10) Patent No.: US 12,198,304 B1
(45) Date of Patent: Jan. 14, 2025

(54) REAL TIME DISCRETE COSINE TRANSFORM IMAGE AND VIDEO PROCESSING WITH CONVOLUTIONAL NEURAL NETWORK ARCHITECTURE

(71) Applicant: AtomBeam Technologies Inc., Moraga, CA (US)

(72) Inventors: Zhu Li, Overland Park, KS (US); Paras Maharjan, Kansas City, KS (US)

(73) Assignee: ATOMBEAM TECHNOLOGIES INC, Moraga, CA (US)

( * ) Notice: Subject to any disclaimer, the term of this patent is extended or adjusted under 35 U.S.C. 154(b) by 0 days.

(21) Appl. No.: 18/596,677

(22) Filed: Mar. 6, 2024

(51) Int. Cl.
*G06T 5/60* (2024.01)
*G06T 5/10* (2006.01)
*G06T 5/73* (2024.01)

(52) U.S. Cl.
CPC .................. *G06T 5/60* (2024.01); *G06T 5/10* (2013.01); *G06T 5/73* (2024.01); *G06T 2207/20021* (2013.01); *G06T 2207/20052* (2013.01); *G06T 2207/20064* (2013.01); *G06T 2207/20081* (2013.01); *G06T 2207/20084* (2013.01)

(58) Field of Classification Search
CPC .... G06T 5/60; G06T 5/10; G06T 5/73; G06T 2207/20021; G06T 2207/20052; G06T 2207/20064; G06T 2207/20081; G06T 2207/20084
See application file for complete search history.

(56) References Cited

U.S. PATENT DOCUMENTS 11,669,939 B1 * 6/2023 Ferrés ....................... G06T 5/60
  382/167
2023/0360383 A1 * 11/2023 Lee ......................... G06V 10/72

OTHER PUBLICATIONS

Maharjan, Paras, et al. "DCTResNet: Transform Domain Image Deblocking for Motion Blur Images." 2021 International Conference on Visual Communications and Image Processing (VCIP). IEEE, 2021. (Year: 2021).*

* cited by examiner

*Primary Examiner* — Bobbak Safaipour
(74) *Attorney, Agent, or Firm* — Galvin Patent Law LLC; Brian R. Galvin (57) ABSTRACT

A system and method for real time discrete cosine transform image and video processing with convolutional neural network architecture. The system and method incorporate discrete cosine transform image processing with convolutional neural networks to achieve fast and efficient image processing that yields more reliable results than previously used image processing methods. The proposed system and method enable effective, real time, image processing which is applicable to a wide range of imaging and video devices.

14 Claims, 9 Drawing Sheets

REAL TIME DISCRETE COSINE TRANSFORM IMAGE AND VIDEO PROCESSING WITH CONVOLUTIONAL NEURAL NETWORK ARCHITECTURE

CROSS-REFERENCE TO RELATED APPLICATIONS

Priority is claimed in the application data sheet to the following patents or patent applications, each of which is expressly incorporated herein by reference in its entirety: None.

BACKGROUND OF THE INVENTION

Field of the Art

The present invention is in the field of image processing, and more particularly image deblurring.

Discussion of the State of the Art

Image deblurring is a classical low-level vision task of enhancing and improving the quality of an image by removing blurring artifacts that are caused by factors such as camera motion, object motion, missed focus, insufficient depth of field, or lens softness. Blur in an image is unavoidable, but can be minimized using good quality sensors and post processing methods. In smartphone cameras, image blur is common and noticeable because of the compact form factor lens and imagine sensor used in smartphones. Image deblurring is an essential step in improving image and video systems which in turn increases the quality of image reproduction, ultimately leading to better visual perception.

Modern processing techniques can be divided into two major categories: spatial domain processing and transform domain processing. Out of the two major categories, spatial domain processing is more commonly used and generally pertains to processing in either RGB color space or in the raw sensor space. The process involves manipulating or enhancing an image by working directly with an image's pixel values. Even earlier methods such as inverse filtering and Wiener filtering try to deblur images by converting into a frequency domain, provided the degradation of the image is from a known global blur kernel. Very few methods employ transform domain processing that usually decomposes an image into subband images and then performs processing in the transform domain.

Most conventional methods rely on the energy optimization approach to jointly estimate the blur kernel and latent sharp image from a single blurry image. The energy optimization approach refers to techniques that minimize an energy function associated with an image. The approach may be applied to a variety of image processing methods, including image deblurring. These methods assume that a scene is static and that any blur is caused by camera motion only. Some recent methods for dynamic scenes assume that blur in an image is caused by both camera motion and object motion. Blind motion deblurring further assumes that blur in an image is non-uniformly distributed and performs image deblurring by segmenting the image into regions with different blurs and uses a box filter to restore a sharp image.

Recent advancements in deep learning and the availability of realistic, real world datasets has spurred the development of using convolutional neural networks (CNNs) for image deblurring. Multiscale CNNs use coarse to fine architecture to gradually restore a sharp image on different resolutions in a pyramid. Generally, CNNs are used in tandem with spatial domain processing to produce a restored image.

The issue with currently used image deblurring methods is that they are highly sensitive to noise and fail to restore images when subjective to real world scenarios. Additionally, image and video processing needs to be done after footage or an image is taken in post-production processing. This increases the amount of time and effort it takes to produce high quality videos and images.

What is needed is a system and method for real time video and image processing which utilizes both frequency domain and convolutional neural network techniques to increase the quality and efficiency of image processing which may occur during or after production.

SUMMARY OF THE INVENTION

Accordingly, the inventor has conceived and reduced to practice, a system and method for real time discrete cosine transform image and video processing with convolutional neural network architecture. It incorporates discrete cosine transform image processing with convolutional neural networks to achieve fast and efficient image processing that yields more reliable results than previous methods. Traditional convolutional neural networks have been applied to spatial domain processing, however, applying convolutional neural networks to transform domain processing demonstrates far better results than ever achieved with spatial domain processing. The proposed system and method enable effective, real time, image processing which is applicable to a wide range of image and video inputs. Additionally, the proposed system and method allow for low-latency image processing because the entire method and system is linear. There is no need to loop through the system and method more than once which frees up computational power and time.

Studies show that the proposed system and method produce far more accurate results than currently utilized image processing methods. When compared against other image processing methods, the proposed system and method maintains the highest Peak Signal-to-Noise Ratio (PSNR) using both ensembled and non-ensembled methods. Ensemble learning is where a neural network uses a plurality of neural network models to achieve a goal. The proposed system and method outperform other network's PSNR when it uses a singular neural network and when it uses ensembled neural networks.

According to a preferred embodiment, a system for real time discrete cosine transform image and video processing with convolutional neural network architecture is disclosed, comprising: a computing device comprising at least a memory and a processor; a Discrete Cosine Transform (DCT) Block configured to receive an initial input and output a plurality subband images; a DCT Deblur Network system further comprising a DCT Deblur Network DC and a DCT Deblur Network AC; an Inverse Discrete Cosine Transform (IDCT) Block configured to receive an input from the DCT Deblur Network system and output a reconstructed image; and a plurality of programming instructions stored in the memory and operable on the processor, wherein the first plurality of programming instructions, when operating on the processor, cause the computing device to: send a degraded input through the DCT Block where the image is transformed into a plurality of transformed images; process the plurality of transformed images with the DCT Deblur Network system; reconstruct the processed plurality of transformed images in the IDCT Block; and output a reconstructed output where the reconstructed out is a processed version of the degraded input.

According to another preferred embodiment, a method for real time discrete cosine transform image and video processing with convolutional neural network architecture, comprising the steps of: sending a degraded input through a DCT Block where the image is transformed into a plurality of transformed images; processing the plurality of transformed images with a DCT Deblur Network system; reconstructing the processed plurality of transformed images in an IDCT Block; and outputting a reconstructed output where the reconstructed out is a processed version of the degraded input.

According to an aspect of an embodiment, the DCT Deblur Network system further comprises a convolutional neural network.

According to an aspect of an embodiment, the DCT Block transforms the degraded image by using a 4×4 Discrete Cosine Transform function.

According to an aspect of an embodiment, the DCT block transforms the degraded image by using a wavelet transform function.

According to an aspect of an embodiment, the 4×4 Discrete Cosine Transform function creates a plurality of subband images which may either be high energy (AC) or low energy (DC).

According to an aspect of an embodiment, a loss function may be used to compute the transform domain loss for each channel in the DCT Deblur Network system

DETAILED DESCRIPTION OF THE INVENTION

The inventor has conceived, and reduced to practice, a system and method for real time discrete cosine transform image and video processing with convolutional neural network architecture.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Conceptual Architecture

Figure 1:
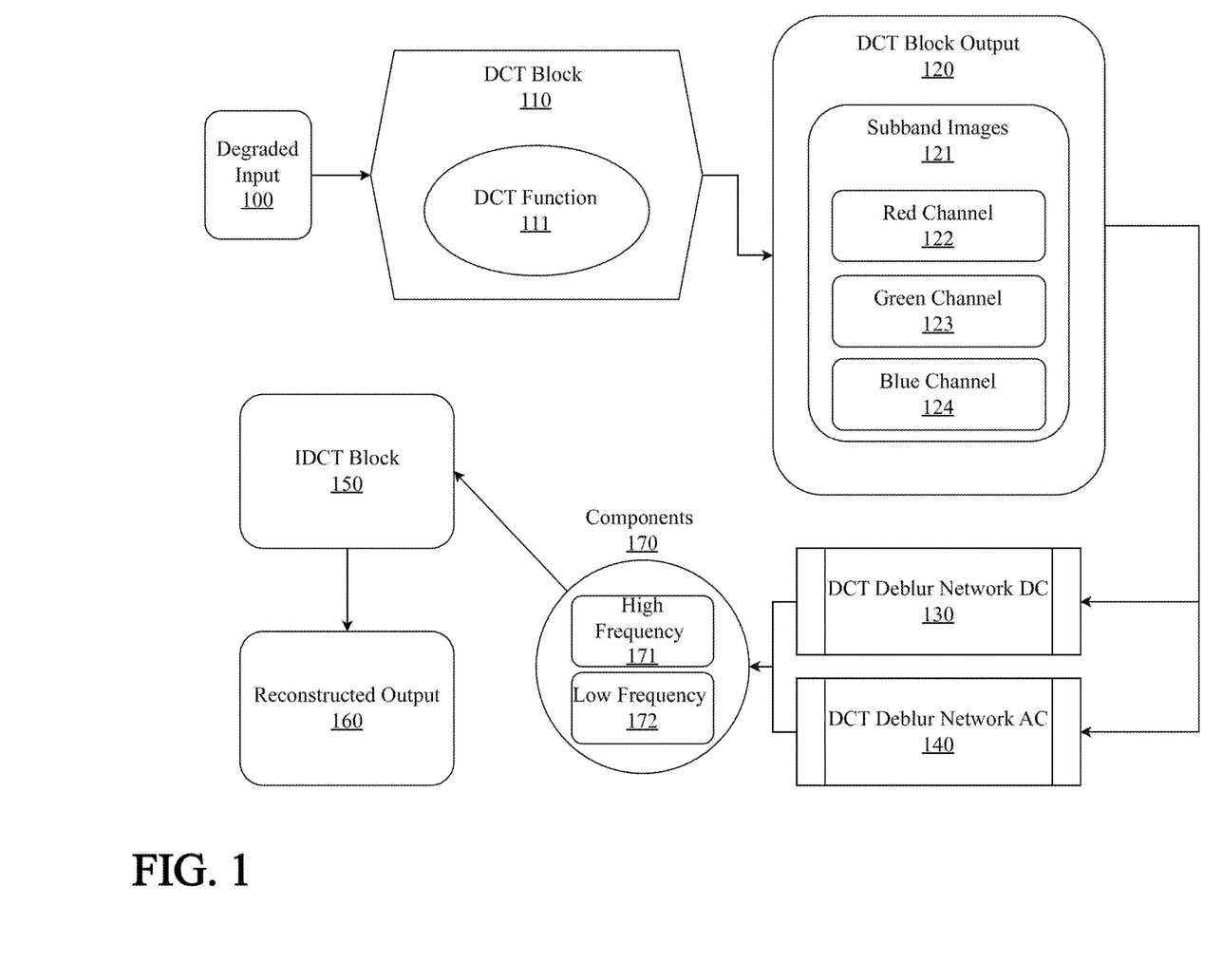
FIG. 1 is a block diagram illustrating an exemplary system architecture for real time discrete cosine transform image and video processing with convolutional neural network architecture, according to an embodiment.

FIG. 1 is a block diagram illustrating an exemplary system architecture for real time discrete cosine transform image and video processing with convolutional neural network architecture, according to an embodiment. The system comprises a degraded input 100, a DCT block 110, a DCT block output 120, a DCT Deblur Network DC channel 130, a DCT Deblur Network AC channel 140, an IDCT block 150, and a reconstructed output 160.

In one embodiment, the degraded input 100 is passed through and transformed into a plurality of subband images by the DCT block 110 which may use a blockwise 4×4 Discrete Cosine Transform (DCT) function 111. A Discrete Cosine Transform function is not the only function that may be used in this process. For example, in one embodiment, the DCT block may use a wavelet transform function instead of a DCT function. The DCT output 120 in one embodiment may be a fraction of the degraded input's 100 resolution with a plurality of subband images 121 for a red 122, a green 123, and a blue 124 channel. The DCT output 120 may be passed through two transform domain deblurring networks, the DCT Deblur Network AC 140 and the DCT Deblur Network DC 130 channels—collectively referred to as the channels. In one embodiment, the channels use a parallel configuration to deblur the plurality of subband images separately for a plurality of high frequency components 171 and a plurality of low frequency components 172—collectively referred to as the components 170. The plurality of high frequency components 171 and the plurality of low frequency components 172 may be passed through an IDCT block 150 which may reconstruct the components using Inverse Discrete Cosine Transform. The IDCT block 150 uses the inverse of the function used in the DCT block 110. In one embodiment, the IDCT block 150 may use an inverse wavelet transform function. The components are reconstructed into a reconstructed output 160.

High frequency components 171 and low frequency components 172 are labeled high and low frequency because of the information they contain. The plurality of subband images may be comprised of a plurality of static images which represent the stationary portions of the degraded input 100 and a plurality of dynamic images which represent the dynamic, blurred portions of the degraded input 100. Static portions of the degraded image 100 are referred to as DC components. Dynamic portions of the degraded image 100 are referred to as AC components.

Figure 2:
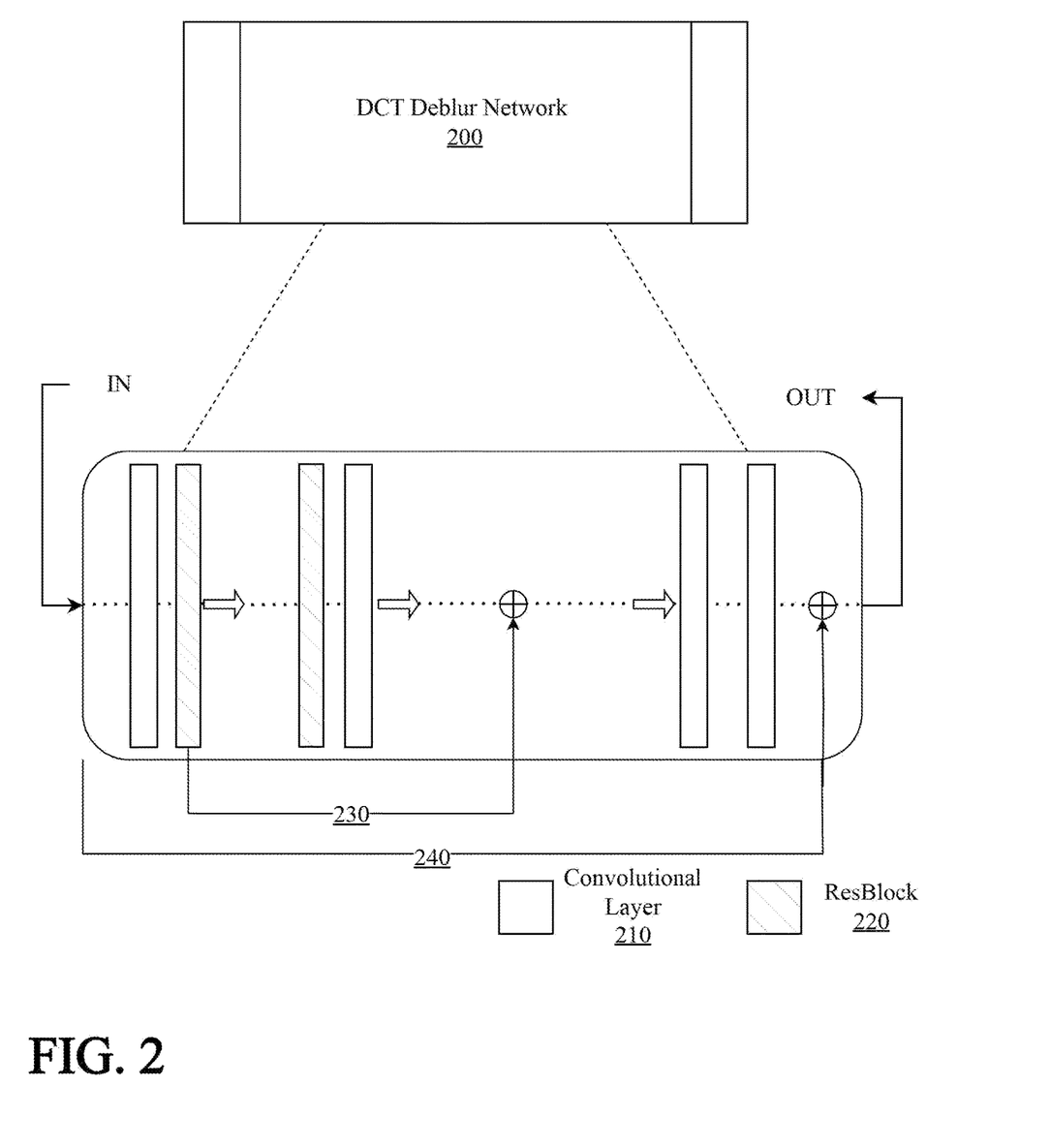
FIG. 2 is a block diagram illustrating an exemplary architecture for a subsystem of the system for real time discrete cosine transform image and video processing with convolutional neural network architecture, a DCT Deblur Network system.

FIG. 2 is a block diagram illustrating an exemplary architecture for a subsystem of the system for real time discrete cosine transform image and video processing with convolutional neural network architecture, a DCT Deblur Network system comprising a DCT Deblur Network DC 130 channel and a DCT Deblur Network AC 140 channel. A DCT Deblur Network channel 200 may be comprised of a plurality of convolutional neural network functions including convolutional layers 210, a plurality of ResBlocks 220, and a plurality of connections which may include a sub-band specific pixel residue connection 240 and a feature-level skip connection 230. In one embodiment, high frequency components 171 and low frequency components 172 are passed through a respective DCT Deblur Network channel 200 by being input through an initial convolutional layer 210. After being input through the initial convolutional layer, the channels may be transformed by a series of convolutional layers 210 and ResBlocks 220 where the series comprises a sub-band specific pixel residue connection 240 and a feature-level skip connection 230. For the purposes of FIG. 4, convolutional layers 210 are shown by a solid white rectangle, as seen in the legend in the bottom of the figure. Likewise, ResBlocks 220 are shown by a rectangle filled with diagonal lines, as seen in the legend in the bottom of the figure.

Figure 3:
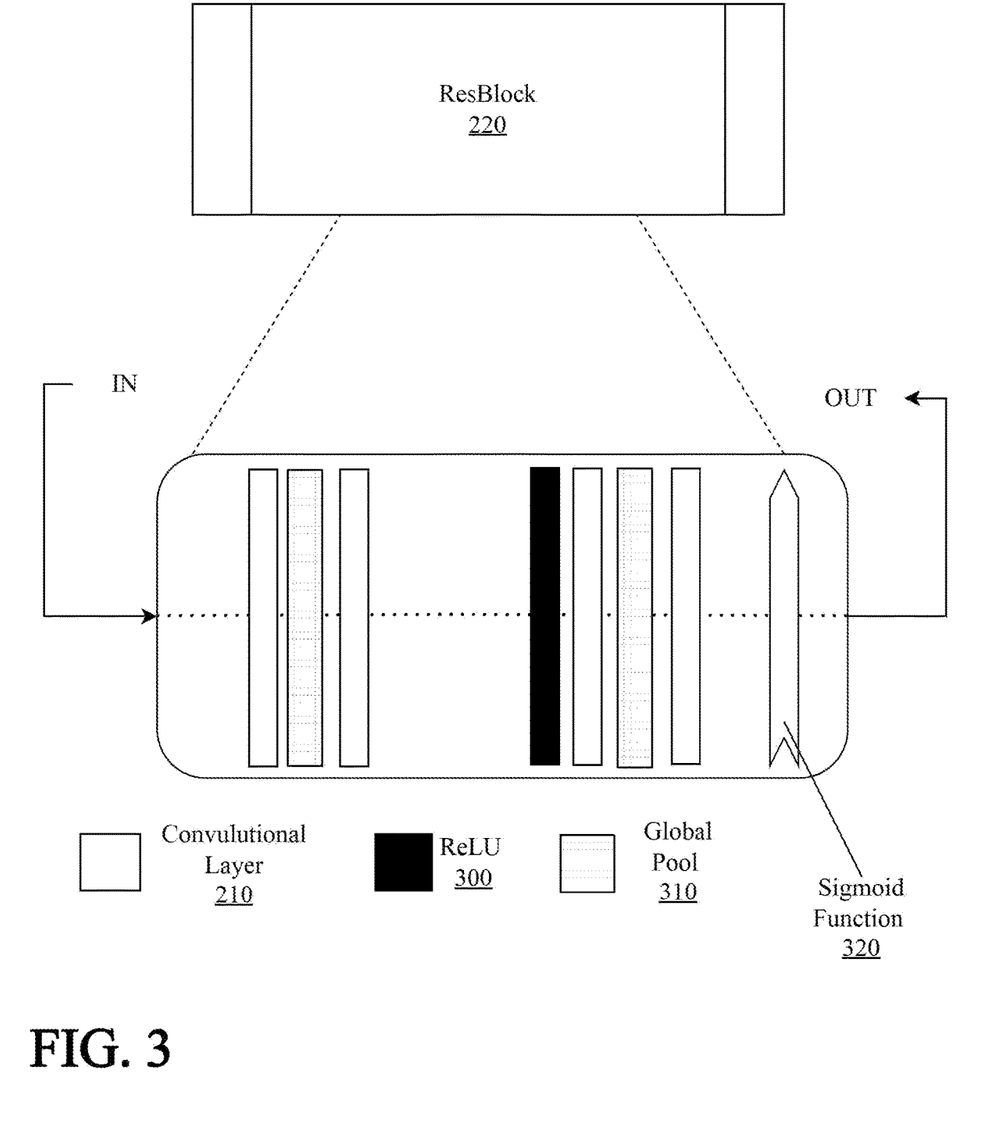
FIG. 3 is a block diagram illustrating an exemplary architecture for a component of the DCT Deblur Network subsystem, a ResBlock.

FIG. 3 is a block diagram illustrating an exemplary architecture for a component of the DCT Deblur Network subsystem, a ResBlock. A ResBlock may be further comprised of a plurality of convolutional layers 210, a plurality of Rectified Linear Units (ReLUs) 300, a plurality of Global Pooling layers 310, and a plurality of Sigmoid Functions 320. In one embodiment, a ResBlock 220 may be comprised of components in the following order: a convolutional layer 210, a ReLU layer 300, a convolutional layer 210, a ReLU layer 300, a convolutional layer 210, a global pooling layer 310, a convolutional layer 210, and a sigmoid function 320 where each layer may contain a plurality of its corresponding components. In FIG. 3, convolutional layers 210 are denoted by solid white rectangles, ReLU layers 300 are denoted by solid black rectangles, and global pooling layers 310 are denoted by grid line filled rectangles. In a typical embodiment, each of the proceeding components work in series to complete a ResBlock 220. The ResBlock 220 works in series with additional convolutional layers 210 in a DCT Deblur Network channel to process subband images 121.

Figure 4:
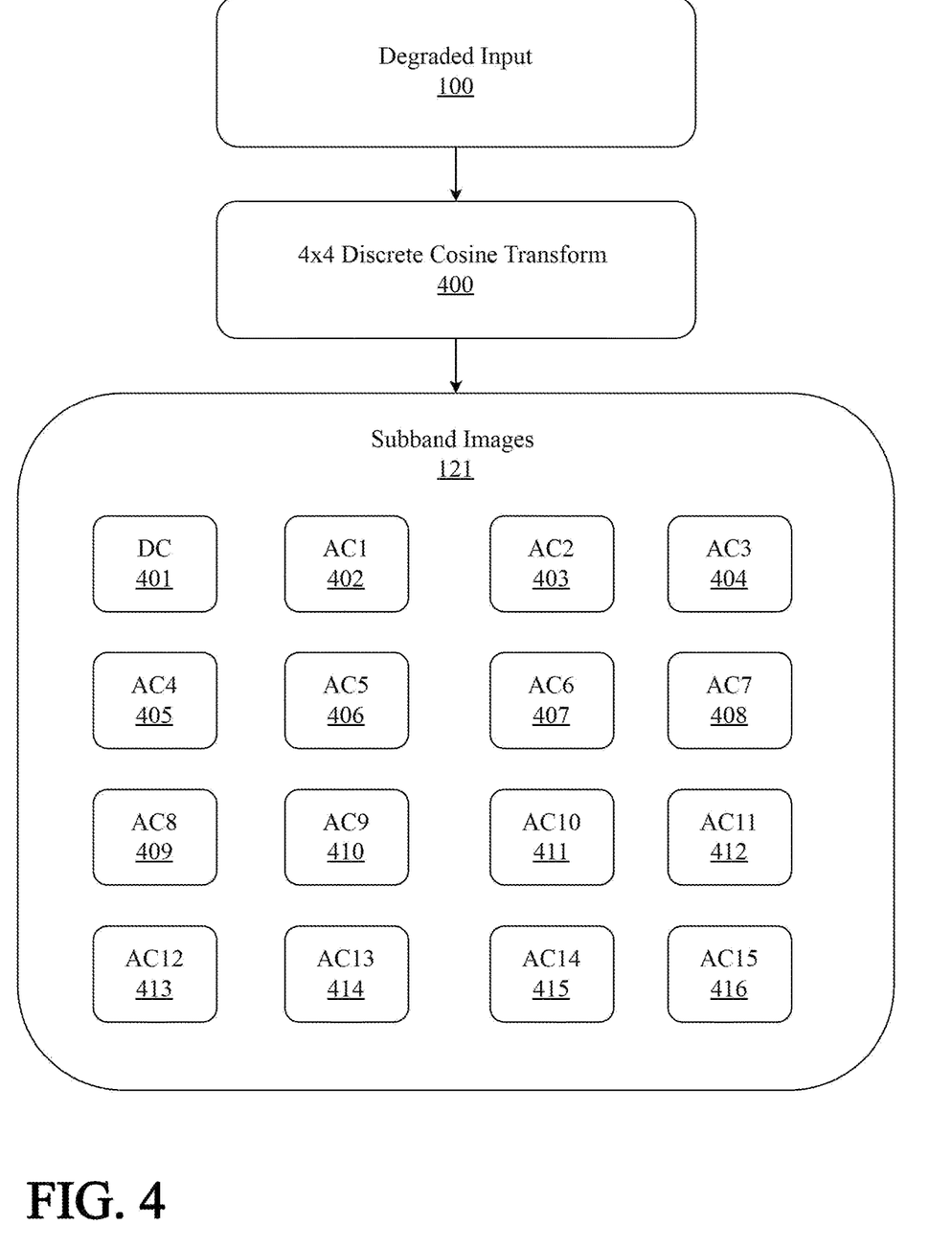
FIG. 4 is a diagram showing an embodiment of one aspect of the real time discrete cosine transform image and video processing with convolutional neural network architecture system, specifically, the DCT Block Output, more specifically, subband images.

FIG. 4 is a diagram showing an embodiment of one aspect of the real time discrete cosine transform image and video processing with convolutional neural network architecture system, specifically, the DCT Block Output 120, more specifically, the subband images. In one embodiment, a 4×4 Discrete Cosine Transform 400 is applied to the degraded input 100 which converts the degraded input 100 into 16 subband images for the red 122, the green 123, and the blue 124 channels. Each color channel may have a plurality of subband images 121 where a plurality of the subband images 121 will be low frequency (DC) images and a plurality of the subband images 121 will be high frequency (AC) images. In one embodiment, there may be one DC image and fifteen AC images. In the embodiment where there is one DC image and fifteen AC images, the DC image 401 contains the most information about the degraded input 100. AC1 402 represents the primary vertical component of the degraded input 100, AC4 405 represents the primary horizontal components of the degraded input 100, and AC5 406 represents the primary diagonal component of the degraded input 100. AC1 402, AC4 405, and AC5 406 contain the second highest level of information behind DC 401. They collectively represent vertical, horizontal, and diagonal motion that causes blurring in the degraded input 100. The remaining AC subband images contain progressively less information in either the vertical, horizontal, or diagonal spaces of the degraded input 100. Breaking an imaging into small subband images 121 where each subband image 121 ranges from high levels of information to low levels of information allows for easier processing of each subband image. Additionally, because the principal components containing high levels of information about the degraded input 100 are known, more priority can be given to those subband images (DC 401, AC1 402, AC4 405, AC5 406) during image processing.

Detailed Description of Exemplary Aspects

Figure 5:
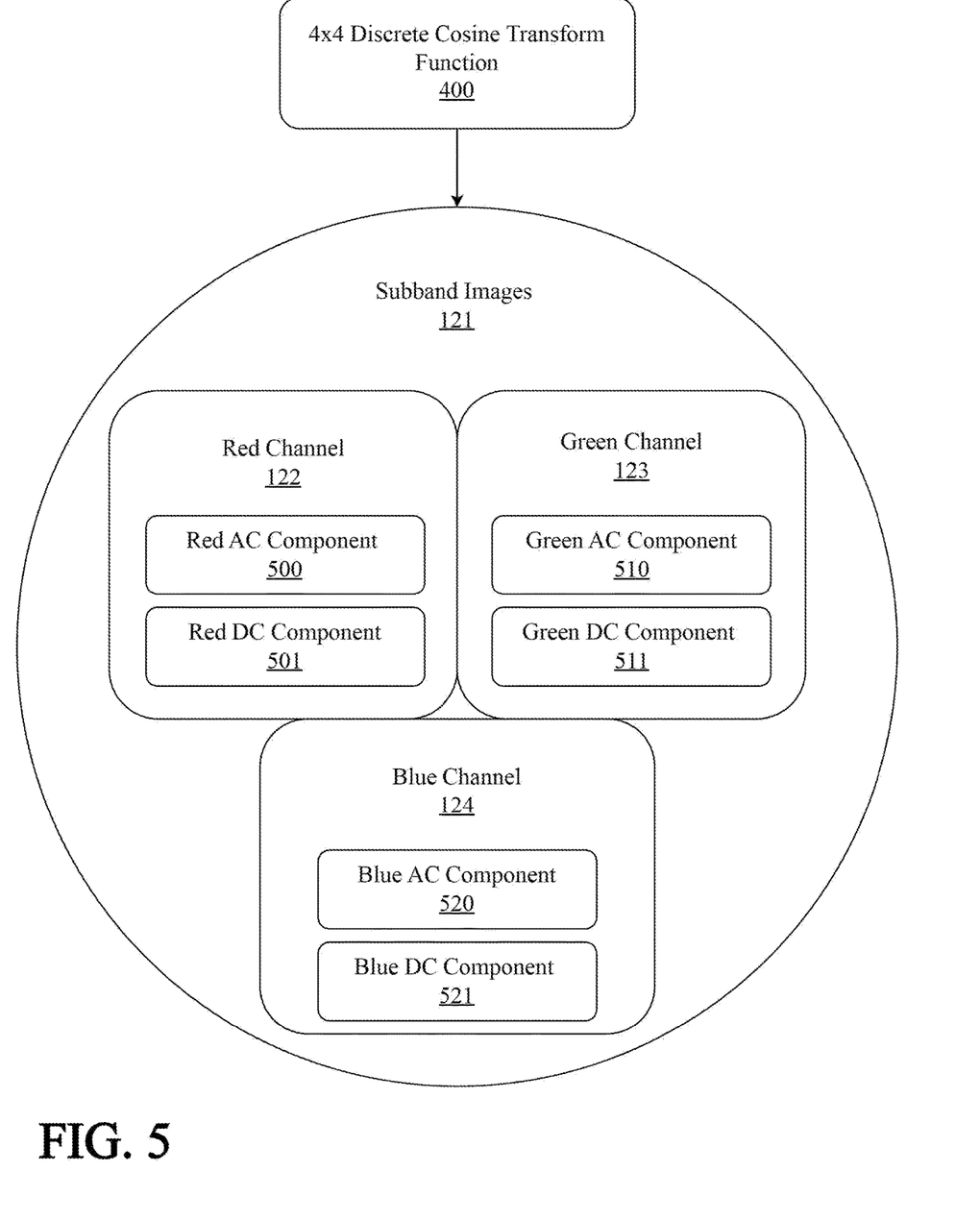
FIG. 5 is a diagram showing an embodiment where the subband images are comprised of three-color components each further comprising an AC component and a DC component.

FIG. 5 is a diagram showing an embodiment where the subband images are comprised of three color components each further comprising an AC component and a DC component. The 4×4 Discrete Cosine Transform function 400 converts the degraded input into three sets of corresponding subband images 121. In one embodiment, there may be three sets of subband images, one for a red channel 122, one for a green channel 123, and one for a blue channel 124. Because a 4×4 Discrete Cosine Transform function 400 was used, the subband images 121 will have sixteen components comprising a plurality of AC and DC components. Each red, green, and blue channel will have corresponding AC and DC component. In one embodiment, the red channel 122 may have one red DC component 501 and fifteen red AC components 500. The green channel 123 may have one green DC component 510 and fifteen green AC components 511. Additionally, the blue channel 124 may have one blue DC component 520 and fifteen blue AC components 521. Each AC and DC component would subsequently be passed into the DCT Deblur Network channels.

Figure 6:
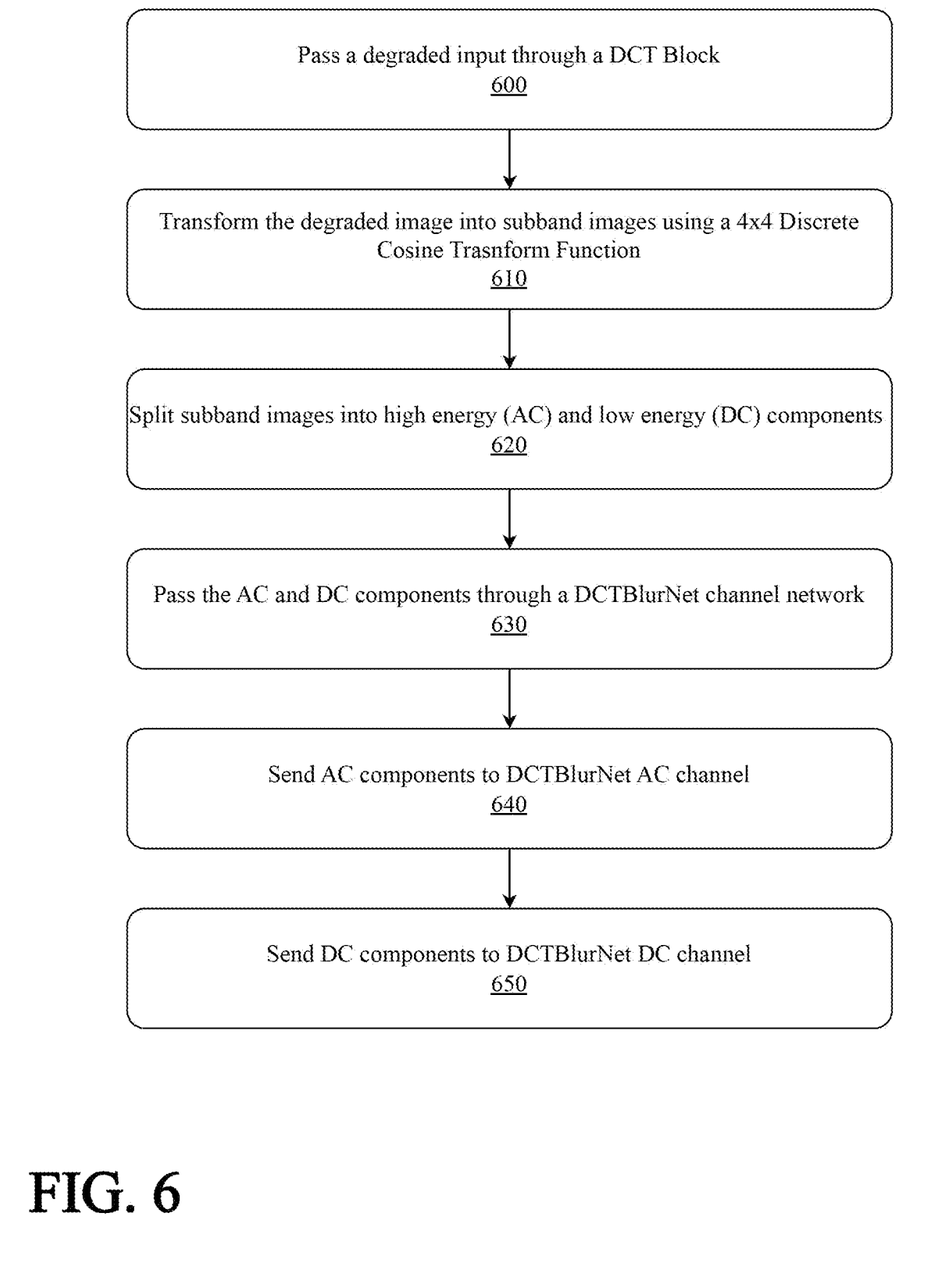
FIG. 6 is a flow diagram illustrating an exemplary method for image and video deconstruction, according to an embodiment.

FIG. 6 is a flow diagram illustrating an exemplary method for image and video deconstruction, according to an embodiment. Regarding the steps in this diagram, there is no strict requirement for the steps to be in this particular order. In a first step 600, a degraded input is passed through a DCT block. In a step 610 the degraded image is transformed into subband images using a 4×4 Discrete Cosine Transform Function. In a step 620, the subband images are split into high energy (AC) and low energy (DC) components. In a step 630, the AC and DC components are passed through a DCT Deblur Network channel. In a step 640, the AC components are sent to a DCT Deblur Network AC channel. In a step 650, the DC components are sent to a DCT Deblur Network DC channel.

Figure 7:
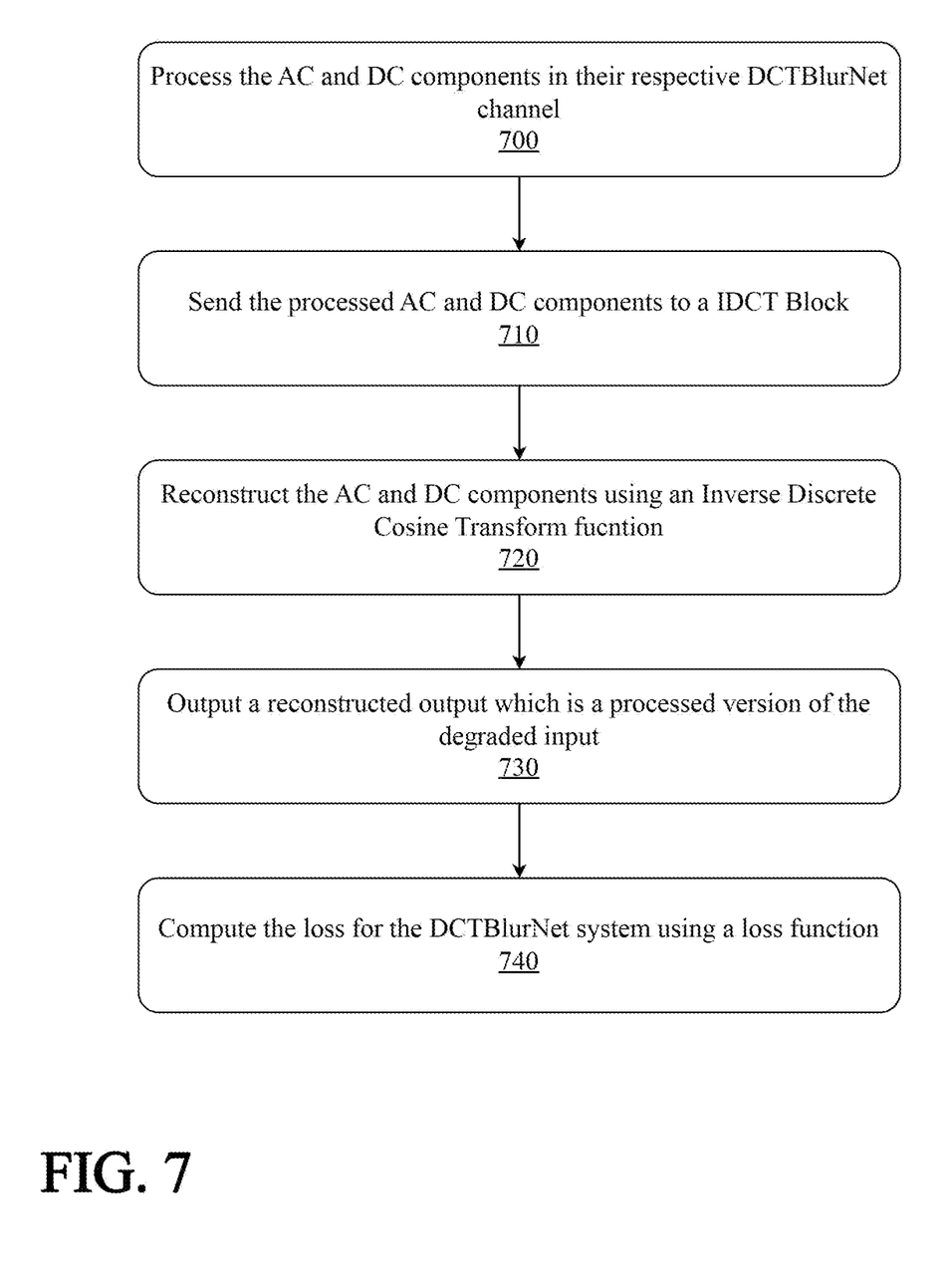
FIG. 7 is a flow diagram illustrating an exemplary method for image and video reconstruction, according to an embodiment.

FIG. 7 is a flow diagram illustrating an exemplary method for image and video reconstruction, according to an embodiment. Regarding the steps in this diagram, there is no strict requirement for the steps to be in this particular order. In a first step 700, the AC and DC components are processed in their respective DCT Deblur Network channel. In a step 710 the processed AC and DC components are sent to an IDCT Block. In a step 720, the AC and DC components are reconstructed using an Inverse Discrete Cosine Transform function. In a step 730, the reconstructed output which is a processed version of the degraded input is output by the IDCT Block. In a step 740, a loss function computes the loss for the DCT Deblur Network channels. In one embodiment, an example of a loss function may be the following:

$$L_1 = \sum_{i=1}^{N} \left\| I_{DCT}(i) - \hat{I}_{DCT}(i) \right\|$$

Where $\hat{I}_{DCT}$ is predicted DCT subband image, $I_{DCT}$ is corresponding ground-truth DCT subband image, and N is the number of pixels. Since AC and DC networks may be trained separately, two loss functions may be used for AC and DC channels, where the DC network is only learning the DC subband images and the AC network is learning all the AC subband images.

Figure 8:
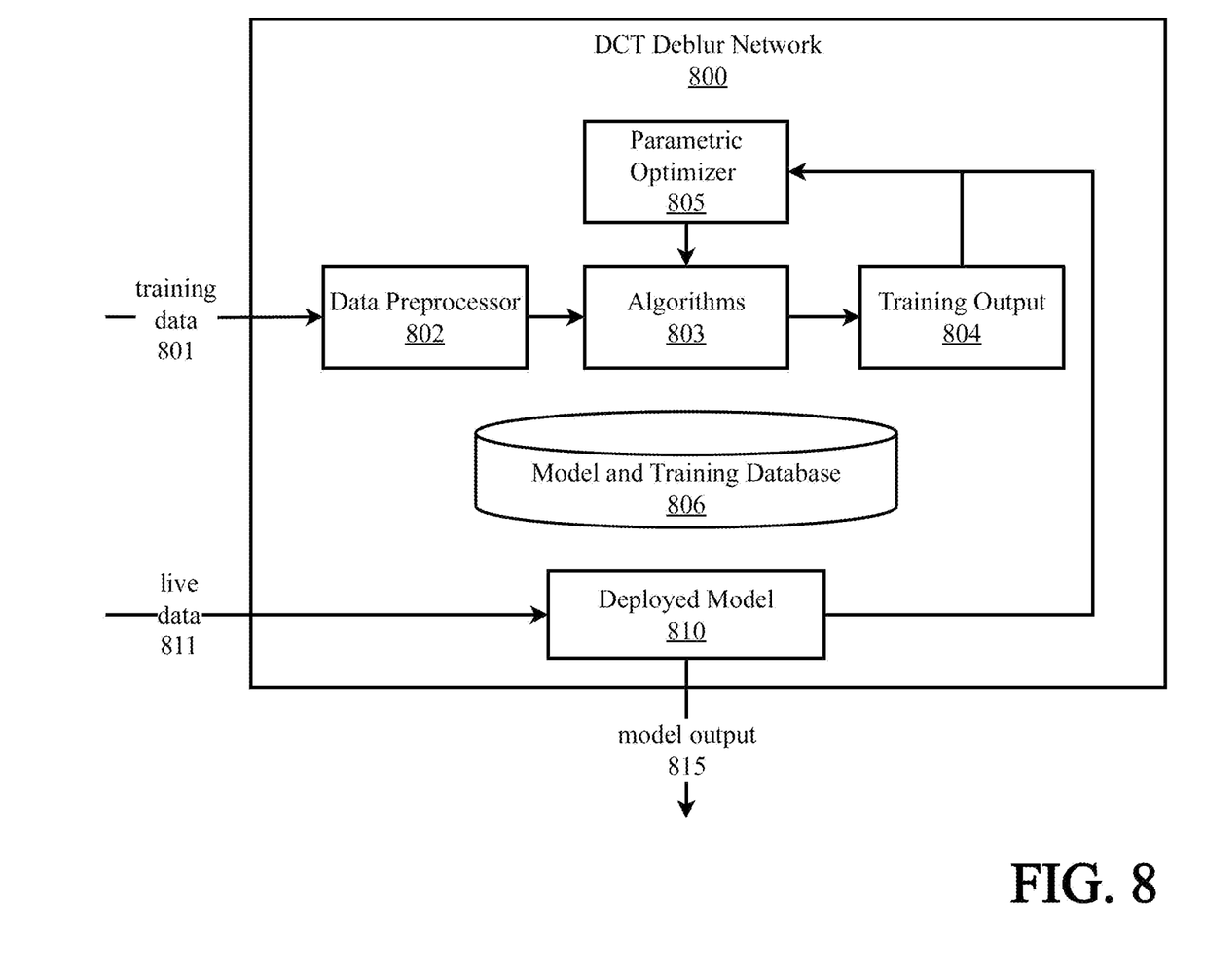
FIG. 8 is a block diagram illustrating an exemplary aspect of a system for image processing using a convolutional neural network, the DCT Deblur Network system.

FIG. 8 is a block diagram illustrating an exemplary aspect of a system for image processing using a convolutional neural network, the DCT Deblur Network system 800. According to the embodiment, DCT Deblur Network system 800 may comprise a model training stage comprising a data preprocessor 802, one or more machine and/or deep learning algorithms 803, training output 804, and a parametric optimizer 805, and a model deployment stage comprising a deployed and fully trained model 810 configured to perform tasks described herein such as transcription, summarization, agent coaching, and agent guidance. DCT Deblur Network system 800 may be used to train and deploy DCT Deblur Network DC 130 and DCT Deblur Network AC 140 in order to support quality of the reconstructed output 160.

At the model training stage, a plurality of training data 801 may be received by the DCT Deblur Network 800. In some embodiments, the plurality of training data may be obtained from one or more database(s) 806 and/or directly from the DCT block 110. Data preprocessor 802 may receive the input data and perform various data preprocessing tasks on the input data to format the data for further processing. For example, data preprocessing can include, but is not limited to, tasks related to data cleansing, data deduplication, data normalization, data transformation, handling missing values, feature extraction and selection, mismatch handling, and/or the like. Data preprocessor 802 may also be configured to create training dataset, a validation dataset, and a test set from the plurality of input data 801. For example, a training dataset may comprise 80% of the preprocessed input data, the validation set 10%, and the test dataset may comprise the remaining 10% of the data. The preprocessed training dataset may be fed as input into one or more machine and/or deep learning algorithms 803 to train a predictive model for object monitoring and detection.

DCT Deblur Network 800 may be fine-tuned using a loss function which compares the predicted subband image against a ground-truth subband image. Fine-tuning involves adjusting the model's parameters to make it perform better on specific tasks or data. In this case, the goal is to improve the model's performance processing images and videos. The fine-tuned models are expected to provide improved accuracy when processing images and videos, which can be crucial for applications like deblurring images. The refined models can be optimized for real-time processing, meaning they can quickly analyze and process an image or video as soon as they are input into the system.

During model training, training output 404 is produced and used to measure the accuracy and usefulness of the predictive outputs. During this process a parametric optimizer 805 may be used to perform algorithmic tuning between model training iterations. Model parameters and hyperparameters can include, but are not limited to, bias, train-test split ratio, learning rate in optimization algorithms (e.g., gradient descent), choice of optimization algorithm (e.g., gradient descent, stochastic gradient descent, of Adam optimizer, etc.), choice of activation function in a neural network layer (e.g., Sigmoid, ReLu, Tan h, etc.), the choice of cost or loss function the model will use, number of hidden layers in a neural network, number of activation unites in each layer, the drop-out rate in a neural network, number of iterations (epochs) in a training the model, number of clusters in a clustering task, kernel or filter size in convolutional layers, pooling size, batch size, the coefficients (or weights) of linear or logistic regression models, cluster centroids, and/or the like. Parameters and hyperparameters may be tuned and then applied to the next round of model training. In this way, the training stage provides a machine learning training loop.

A model and training database 806 is present and configured to store training/test datasets and developed models. Database 806 may also store previous versions of models.

According to some embodiments, the one or more machine and/or deep learning models may comprise any suitable algorithm known to those with skill in the art including, but not limited to: LLMs, generative transformers, transformers, supervised learning algorithms such as: regression (e.g., linear, polynomial, logistic, etc.), decision tree, random forest, k-nearest neighbor, support vector machines, Naïve-Bayes algorithm; unsupervised learning algorithms such as clustering algorithms, hidden Markov models, singular value decomposition, and/or the like. Alternatively, or additionally, algorithms 803 may comprise a deep learning algorithm such as neural networks (e.g., recurrent, convolutional, long short-term memory networks, etc.).

In some implementations, the DCT Deblur Network 800 automatically generates standardized model scorecards for each model produced to provide rapid insights into the model and training data, maintain model provenance, and track performance over time. These model scorecards provide insights into model framework(s) used, training data, training data specifications such as chip size, stride, data splits, baseline hyperparameters, and other factors. Model scorecards may be stored in database 810.

Exemplary Computing Environment

Figure 9:
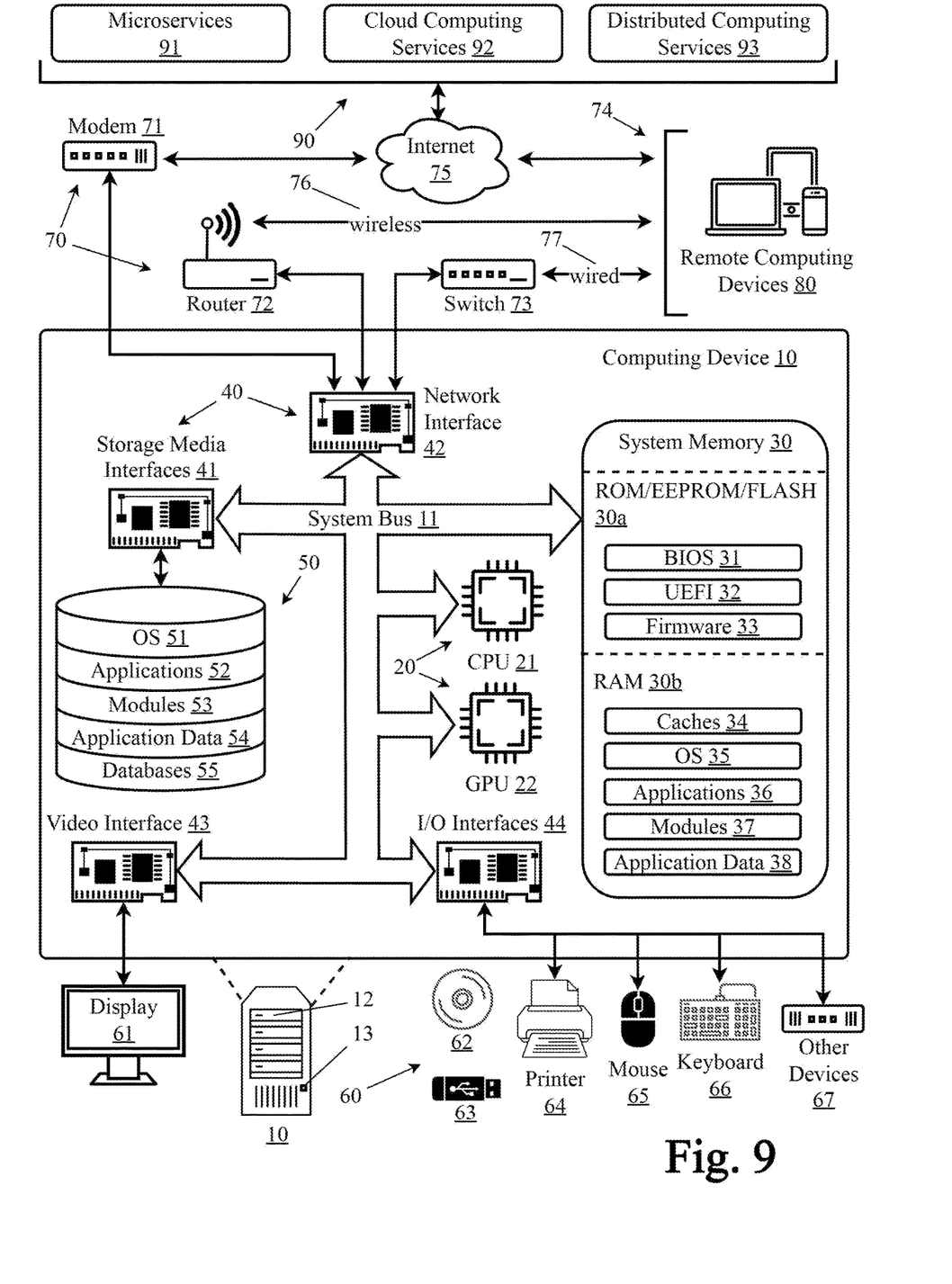
FIG. 9 illustrates an exemplary computing environment on which an embodiment described herein may be implemented, in full or in part.

FIG. 9 illustrates an exemplary computing environment on which an embodiment described herein may be implemented, in full or in part. This exemplary computing environment describes computer-related components and processes supporting enabling disclosure of computer-implemented embodiments. Inclusion in this exemplary computing environment of well-known processes and computer components, if any, is not a suggestion or admission that any embodiment is no more than an aggregation of such processes or components. Rather, implementation of an embodiment using processes and components described in this exemplary computing environment will involve programming or configuration of such processes and components resulting in a machine specially programmed or configured for such implementation. The exemplary computing environment described herein is only one example of such an environment and other configurations of the components and processes are possible, including other relationships between and among components, and/or absence of some processes or components described. Further, the exemplary computing environment described herein is not intended to suggest any limitation as to the scope of use or functionality of any embodiment implemented, in whole or in part, on components or processes described herein. The exemplary computing environment described herein comprises a computing device 10 (further comprising a system bus 11, one or more processors 20, a system memory 30, one or more interfaces 40, one or more non-volatile data storage devices 50), external peripherals and accessories 60, external communication devices 70, remote computing devices 80, and cloud-based services 90.

System bus 11 couples the various system components, coordinating operation of and data transmission between, those various system components. System bus 11 represents one or more of any type or combination of types of wired or wireless bus structures including, but not limited to, memory busses or memory controllers, point-to-point connections, switching fabrics, peripheral busses, accelerated graphics ports, and local busses using any of a variety of bus architectures. By way of example, such architectures include, but are not limited to, Industry Standard Architecture (ISA) busses, Micro Channel Architecture (MCA) busses, Enhanced ISA (EISA) busses, Video Electronics Standards Association (VESA) local busses, a Peripheral Component Interconnects (PCI) busses also known as a Mezzanine busses, or any selection of, or combination of, such busses. Depending on the specific physical implementation, one or more of the processors 20, system memory 30 and other components of the computing device 10 can be physically co-located or integrated into a single physical component, such as on a single chip. In such a case, some or all of system bus 11 can be electrical pathways within a single chip structure.

Computing device may further comprise externally-accessible data input and storage devices 12 such as compact disc read-only memory (CD-ROM) drives, digital versatile discs (DVD), or other optical disc storage for reading and/or writing optical discs 62; magnetic cassettes, magnetic tape, magnetic disk storage, or other magnetic storage devices; or any other medium which can be used to store the desired content and which can be accessed by the computing device 10. Computing device may further comprise externally-accessible data ports or connections 12 such as serial ports, parallel ports, universal serial bus (USB) ports, and infrared ports and/or transmitter/receivers. Computing device may further comprise hardware for wireless communication with external devices such as IEEE 1394 ("Firewire") interfaces, IEEE 802.11 wireless interfaces, BLUETOOTH® wireless interfaces, and so forth. Such ports and interfaces may be used to connect any number of external peripherals and accessories 60 such as visual displays, monitors, and touch-sensitive screens 61, USB solid state memory data storage drives (commonly known as "flash drives" or "thumb drives") 63, printers 64, pointers and manipulators such as mice 65, keyboards 66, and other devices 67 such as joysticks and gaming pads, touchpads, additional displays and monitors, and external hard drives (whether solid state or disc-based), microphones, speakers, cameras, and optical scanners.

Processors 20 are logic circuitry capable of receiving programming instructions and processing (or executing) those instructions to perform computer operations such as retrieving data, storing data, and performing mathematical calculations. Processors 20 are not limited by the materials from which they are formed or the processing mechanisms employed therein, but are typically comprised of semiconductor materials into which many transistors are formed together into logic gates on a chip (i.e., an integrated circuit or IC). The term processor includes any device capable of receiving and processing instructions including, but not limited to, processors operating on the basis of quantum computing, optical computing, mechanical computing (e.g., using nanotechnology entities to transfer data), and so forth. Depending on configuration, computing device 10 may comprise more than one processor. For example, computing device 10 may comprise one or more central processing units (CPUs) 21, each of which itself has multiple processors or multiple processing cores, each capable of independently or semi-independently processing programming instructions. Further, computing device 10 may comprise one or more specialized processors such as a graphics processing unit (GPU) 22 configured to accelerate processing of computer graphics and images via a large array of specialized processing cores arranged in parallel.

System memory 30 is processor-accessible data storage in the form of volatile and/or nonvolatile memory. System memory 30 may be either or both of two types: non-volatile memory and volatile memory. Non-volatile memory 30a is not erased when power to the memory is removed, and includes memory types such as read only memory (ROM), electronically erasable programmable memory (EEPROM), and rewritable solid-state memory (commonly known as "flash memory"). Non-volatile memory 30a is typically used for long-term storage of a basic input/output system (BIOS) 31, containing the basic instructions, typically loaded during computer startup, for transfer of information between components within computing device, or a unified extensible firmware interface (UEFI), which is a modern replacement for BIOS that supports larger hard drives, faster boot times, more security features, and provides native support for graphics and mouse cursors. Non-volatile memory 30a may also be used to store firmware comprising a complete operating system 35 and applications 36 for operating computer-controlled devices. The firmware approach is often used for purpose-specific computer-controlled devices such as appliances and Internet-of-Things (IoT) devices where processing power and data storage space is limited. Volatile memory 30b is erased when power to the memory is removed and is typically used for short-term storage of data for processing. Volatile memory 30b includes memory types such as random-access memory (RAM), and is normally the primary operating memory into which the operating system 35, applications 36, program modules 37, and application data 38 are loaded for execution by processors 20. Volatile memory 30b is generally faster than non-volatile memory 30a due to its electrical characteristics and is directly accessible to processors 20 for processing of instructions and data storage and retrieval. Volatile memory 30b may comprise one or more smaller cache memories which operate at a higher clock speed and are typically placed on the same IC as the processors to improve performance.

Interfaces 40 may include, but are not limited to, storage media interfaces 41, network interfaces 42, display interfaces 43, and input/output interfaces 44. Storage media interface 41 provides the necessary hardware interface for loading data from non-volatile data storage devices 50 into system memory 30 and storage data from system memory 30 to non-volatile data storage device 50. Network interface 42 provides the necessary hardware interface for computing device 10 to communicate with remote computing devices 80 and cloud-based services 90 via one or more external communication devices 70. Display interface 43 allows for connection of displays 61, monitors, touchscreens, and other visual input/output devices. Display interface 43 may include a graphics card for processing graphics-intensive calculations and for handling demanding display requirements. Typically, a graphics card includes a graphics processing unit (GPU) and video RAM (VRAM) to accelerate display of graphics. One or more input/output (I/O) interfaces 44 provide the necessary support for communications between computing device 10 and any external peripherals and accessories 60. For wireless communications, the necessary radio-frequency hardware and firmware may be connected to I/O interface 44 or may be integrated into I/O interface 44.

Non-volatile data storage devices 50 are typically used for long-term storage of data. Data on non-volatile data storage devices 50 is not erased when power to the non-volatile data storage devices 50 is removed. Non-volatile data storage devices 50 may be implemented using any technology for non-volatile storage of content including, but not limited to, CD-ROM drives, digital versatile discs (DVD), or other optical disc storage; magnetic cassettes, magnetic tape, magnetic disc storage, or other magnetic storage devices; solid state memory technologies such as EEPROM or flash memory; or other memory technology or any other medium which can be used to store data without requiring power to retain the data after it is written. Non-volatile data storage devices 50 may be non-removable from computing device 10 as in the case of internal hard drives, removable from computing device 10 as in the case of external USB hard drives, or a combination thereof, but computing device will typically comprise one or more internal, non-removable hard drives using either magnetic disc or solid-state memory technology. Non-volatile data storage devices 50 may store any type of data including, but not limited to, an operating system 51 for providing low-level and mid-level functionality of computing device 10, applications 52 for providing high-level functionality of computing device 10, program modules 53 such as containerized programs or applications, or other modular content or modular programming, application data 54, and databases 55 such as relational databases, non-relational databases, and graph databases. In some implementations, data storage devices may be volatile, non-volatile, or semi-volatile, or some combination thereof.

Applications (also known as computer software or software applications) are sets of programming instructions designed to perform specific tasks or provide specific functionality on a computer or other computing devices. Applications are typically written in high-level programming languages such as C++, Java, and Python, which are then either interpreted at runtime or compiled into low-level, binary, processor-executable instructions operable on processors 20. Applications may be containerized so that they can be run on any computer hardware running any known operating system. Containerization of computer software is a method of packaging and deploying applications along with their operating system dependencies into self-contained, isolated units known as containers. Containers provide a lightweight and consistent runtime environment that allows applications to run reliably across different computing environments, such as development, testing, and production systems.

The memories and non-volatile data storage devices described herein do not include communication media. Communication media are means of transmission of information such as modulated electromagnetic waves or modulated data signals configured to transmit, not store, information. By way of example, and not limitation, communication media includes wired communications such as sound signals transmitted to a speaker via a speaker wire, and wireless communications such as acoustic waves, radio frequency (RF) transmissions, infrared emissions, and other wireless media.

External communication devices 70 are devices that facilitate communications between computing device and either remote computing devices 80, or cloud-based services 90, or both. External communication devices 70 include, but are not limited to, data modems 71 which facilitate data transmission between computing device and the Internet 75 via a common carrier such as a telephone company or internet service provider (ISP), routers 72 which facilitate data transmission between computing device and other devices, and switches 73 which provide direct data communications between devices on a network. Here, modem 71 is shown connecting computing device 10 to both remote computing devices 80 and cloud-based services 90 via the Internet 75. While modem 71, router 72, and switch 73 are shown here as being connected to network interface 42, many different network configurations using external communication devices 70 are possible. Using external communication devices 70, networks may be configured as local area networks (LANs) for a single location, building, or campus, wide area networks (WANs) comprising data networks that extend over a larger geographical area, and virtual private networks (VPNs) which can be of any size but connect computers via encrypted communications over public networks such as the Internet 75. As just one exemplary network configuration, network interface 42 may be connected to switch 73 which is connected to router 72 which is connected to modem 71 which provides access for computing device 10 to the Internet 75. Further, any combination of wired 77 or wireless 76 communications between and among computing device 10, external communication devices 70, remote computing devices 80, and cloud-based services 90 may be used. Remote computing devices 80, for example, may communicate with computing device through a variety of communication channels 74 such as through switch 73 via a wired 77 connection, through router 72 via a wireless connection 76, or through modem 71 via the Internet 75. Furthermore, while not shown here, other hardware that is specifically designed for servers may be employed. For example, secure socket layer (SSL) acceleration cards can be used to offload SSL encryption computations, and transmission control protocol/internet protocol (TCP/IP) offload hardware and/or packet classifiers on network interfaces 42 may be installed and used at server devices.

In a networked environment, certain components of computing device 10 may be fully or partially implemented on remote computing devices 80 or cloud-based services 90. Data stored in non-volatile data storage device 50 may be received from, shared with, duplicated on, or offloaded to a non-volatile data storage device on one or more remote computing devices 80 or in a cloud computing service 92. Processing by processors 20 may be received from, shared with, duplicated on, or offloaded to processors of one or more remote computing devices 80 or in a distributed computing service 93. By way of example, data may reside on a cloud computing service 92, but may be usable or otherwise accessible for use by computing device 10. Also, certain processing subtasks may be sent to a microservice 91 for processing with the result being transmitted to computing device 10 for incorporation into a larger processing task. Also, while components and processes of the exemplary computing environment are illustrated herein as discrete units (e.g., OS 51 being stored on non-volatile data storage device 51 and loaded into system memory 35 for use) such processes and components may reside or be processed at various times in different components of computing device 10, remote computing devices 80, and/or cloud-based services 90. In an embodiment, computing device 10 may be implemented as a virtualized computing device.

In an implementation, the disclosed systems and methods may utilize, at least in part, containerization techniques to execute one or more processes and/or steps disclosed herein. Containerization is a lightweight and efficient virtualization technique that allows you to package and run applications and their dependencies in isolated environments called containers. One of the most popular containerization platforms is Docker, which is widely used in software development and deployment. Containerization, particularly with open-source technologies like Docker and container orchestration systems like Kubernetes, is a common approach for deploying and managing applications. Containers are created from images, which are lightweight, standalone, and executable packages that include application code, libraries, dependencies, and runtime. Images are often built from a Dockerfile, which contains instructions for assembling the image. Dockerfiles are configuration files that specify how to build a Docker image. They include commands for installing dependencies, copying files, setting environment variables, and defining runtime configurations. Docker images are stored in repositories, which can be public or private. Docker Hub is a public registry, and organizations often set up private registries for security and version control. Containers can communicate with each other and the external world through networking. Docker provides a bridge network by default but can be used with custom networks. Containers within the same network can communicate using container names or IP addresses.

Remote computing devices 80 are any computing devices not part of computing device 10. Remote computing devices 80 include, but are not limited to, personal computers, server computers, thin clients, thick clients, personal digital assistants (PDAs), mobile telephones, watches, tablet computers, laptop computers, multiprocessor systems, microprocessor based systems, set-top boxes, programmable consumer electronics, video game machines, game consoles, portable or handheld gaming units, network terminals, desktop personal computers (PCs), minicomputers, main frame computers, network nodes, and distributed or multi-processing computing environments. While remote computing devices 80 are shown for clarity as being separate from cloud-based services 90, cloud-based services 90 are implemented on collections of networked remote computing devices 80.

Cloud-based services 90 are Internet-accessible services implemented on collections of networked remote computing devices 80. Cloud-based services are typically accessed via application programming interfaces (APIs) which are software interfaces which provide access to computing services within the cloud-based service via API calls, which are pre-defined protocols for requesting a computing service and receiving the results of that computing service. While cloud-based services may comprise any type of computer processing or storage, three common categories of cloud-based services 90 are microservices 91, cloud computing services 92, and distributed computing services 93.

Microservices 91 are collections of small, loosely coupled, and independently deployable computing services. Each microservice represents a specific computing functionality and runs as a separate process or container. Microservices promote the decomposition of complex applications into smaller, manageable services that can be developed, deployed, and scaled independently. These services communicate with each other through well-defined application programming interfaces (APIs), typically using lightweight protocols like HTTP or message queues. Microservices 91 can be combined to perform more complex processing tasks.

Cloud computing services 92 are delivery of computing resources and services over the Internet 75 from a remote location. Cloud computing services 92 provide additional computer hardware and storage on as-needed or subscription basis. Cloud computing services 92 can provide large amounts of scalable data storage, access to sophisticated software and powerful server-based processing, or entire computing infrastructures and platforms. For example, cloud computing services can provide virtualized computing resources such as virtual machines, storage, and networks, platforms for developing, running, and managing applications without the complexity of infrastructure management, and complete software applications over the Internet on a subscription basis.

Distributed computing services 93 provide large-scale processing using multiple interconnected computers or nodes to solve computational problems or perform tasks collectively. In distributed computing, the processing and storage capabilities of multiple machines are leveraged to work together as a unified system. Distributed computing services are designed to address problems that cannot be efficiently solved by a single computer or that require large-scale computational power. These services enable parallel processing, fault tolerance, and scalability by distributing tasks across multiple nodes.

Although described above as a physical device, computing device 10 can be a virtual computing device, in which case the functionality of the physical components herein described, such as processors 20, system memory 30, network interfaces 40, and other like components can be provided by computer-executable instructions. Such computer-executable instructions can execute on a single physical computing device, or can be distributed across multiple physical computing devices, including being distributed across multiple physical computing devices in a dynamic manner such that the specific, physical computing devices hosting such computer-executable instructions can dynamically change over time depending upon need and availability. In the situation where computing device 10 is a virtualized device, the underlying physical computing devices hosting such a virtualized computing device can, themselves, comprise physical components analogous to those described above, and operating in a like manner. Furthermore, virtual computing devices can be utilized in multiple layers with one virtual computing device executing within the construct of another virtual computing device. Thus, computing device 10 may be either a physical computing device or a virtualized computing device within which computer-executable instructions can be executed in a manner consistent with their execution by a physical computing device. Similarly, terms referring to physical components of the computing device, as utilized herein, mean either those physical components or virtualizations thereof performing the same or equivalent functions.

The skilled person will be aware of a range of possible modifications of the various aspects described above. Accordingly, the present invention is defined by the claims and their equivalents.

What is claimed is:

1. A system for real time discrete cosine transform image and video processing with convolutional neural network architecture, comprising:
   a computing device comprising at least a memory and a processor;
   a Discrete Cosine Transform (DCT) Block configured to receive an initial input and output a plurality subband images;
   a plurality of DCT Deblur Network channels comprising a DCT Deblur Network DC channel and a DCT Deblur Network AC channels, wherein each channel is configured to process a specific frequency component;
   an Inverse Discrete Cosine Transform (IDCT) Block configured to receive an input from the DCT Deblur Network channels and output a reconstructed image;
   a parallel processing unit configured to simultaneously process all DCT Deblur Network channels; and
   a plurality of programming instructions stored in the memory and operable on the processor, wherein the first plurality of programming instructions, when operating on the processor, cause the computing device to:
   send a degraded input through the DCT Block where the degraded image is transformed into a plurality of transformed images;
   simultaneously process the plurality of transformed images with all DCT Deblur Network channels using the parallel processing unit;
   reconstruct the processed plurality of transformed images in the IDCT Block; and
   output a reconstructed output where the reconstructed out is a processed version of the degraded input addressing both compression artifacts and motion blur in compressed video frames.

2. The system of claim 1, wherein the DCT Deblur Network channels further comprise a convolutional neural network.

3. The system of claim 2, wherein the DCT Block transforms the degraded image through a 4×4 Discrete Cosine Transform function.

4. The system of claim 2, wherein the DCT Block transforms the degraded image through a wavelet transform function.

5. The system of claim 2, wherein the DCT Block creates a plurality of subband images which may either be high energy (AC) or low energy (DC).

6. The system of claim 2, further comprising a loss function to compute the transform domain loss for each channel in the DCT Deblur Network channels.

7. A method for real time discrete cosine transform image and video processing with convolutional neural network architecture, comprising the steps of:
   sending a degraded input through a DCT Block where the degraded image is transformed into a plurality of transformed images;
   simultaneously processing the plurality of transformed images using a plurality of DCT Deblur Network channels using the parallel processing unit;
   reconstructing the processed plurality of transformed images in an IDCT Block; and
   outputting a reconstructed output where the reconstructed output is a processed version of the degraded input addressing both compression artifacts and motion blur in compressed video frames.

8. The method of claim 6 7, wherein the DCT Deblur Network channels further comprise a convolutional neural network.

9. The method of claim 8, wherein the DCT Block transforms the degraded image through a 4×4 Discrete Cosine Transform function.

10. The method of claim 8, wherein the DCT Block transforms the degraded images through a wavelet transform function.

11. The method of claim 8, wherein the 4×4 Discrete Cosine Transform function creates a plurality of subband images which may either be high energy (AC) or low energy (DC).

12. The method of claim 8, further comprising a loss function to compute the transform domain loss for each channel in the DCT Deblur Network channels.

13. Non-transitory, computer-readable storage media having computer-executable instructions embodied thereon that, when executed by one or more processors of a computing system employing an asset registry platform for real time discrete cosine transform image and video processing with convolutional neural network architecture, cause the computing system to:

send a degraded input through a DCT Block where the degraded image is transformed into a plurality of transformed images;

simultaneously process the plurality of transformed images using a plurality of DCT Deblur Network channels using the parallel processing unit;

reconstruct the processed plurality of transformed images using an IDCT Block; and     output a reconstructed output where the reconstructed output is a processed version of the degraded input addressing both compression artifacts and motion blur in compressed video frames.

14. A system for real time discrete cosine transform image and video processing with convolutional neural network architecture, comprising one or more computers with executable instructions that, when executed, cause the system to:

send a degraded input through a DCT Block where the degraded image is transformed into a plurality of transformed images;

simultaneously process the plurality of transformed images with all DCT Deblur Network channels using the parallel processing unit;

reconstruct the processed plurality of transformed images in an IDCT Block; and     output a reconstructed output where the reconstructed output is a processed version of the degraded input addressing both compression artifacts and motion blur in compressed video frames.

\* \* \* \* \*